June 30, 1964     H. N. ARMBRUST     3,139,402
METHOD OF TREATMENT OF WATER CONTENT OF A POOL
Filed March 15, 1962
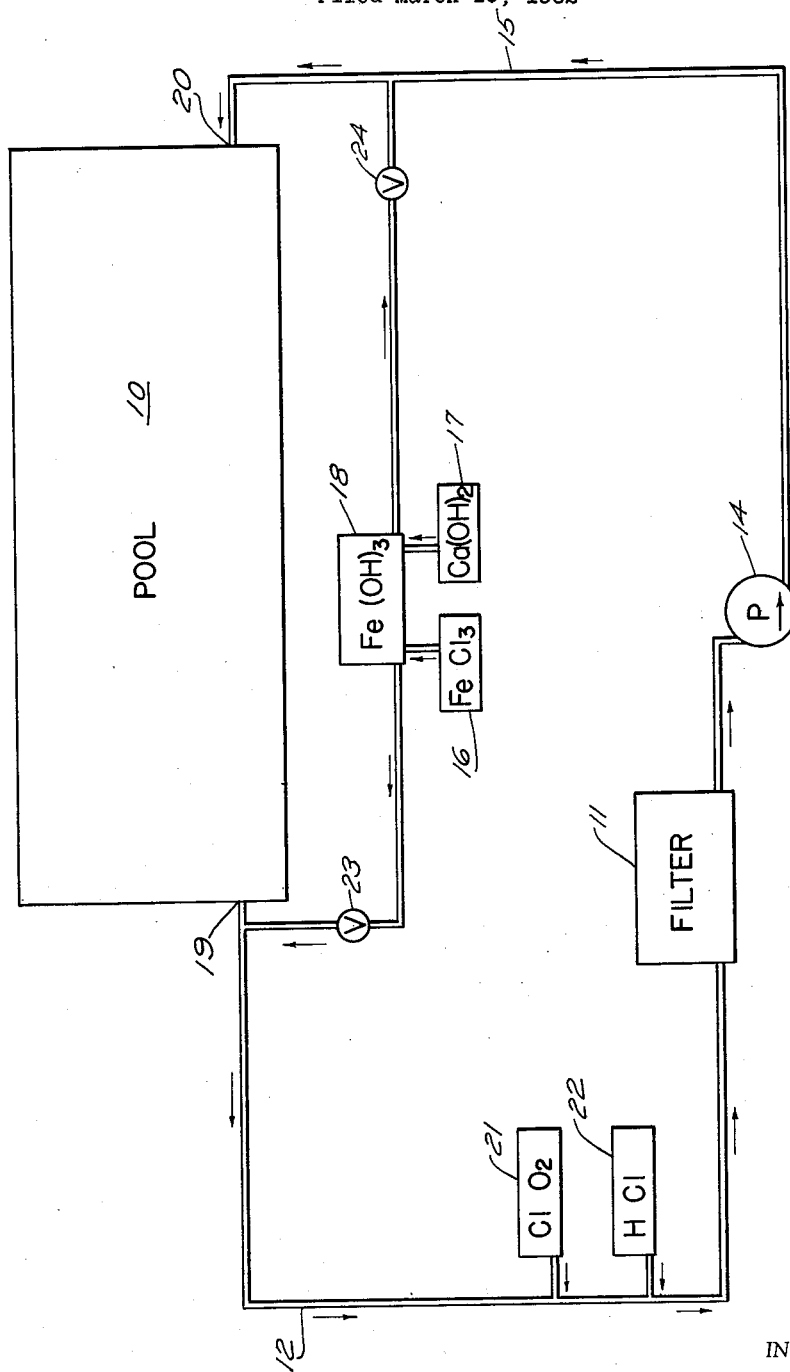
INVENTOR.
HENRY N. ARMBRUST
BY *Barlow & Barlow*
ATTORNEYS

3,139,402
METHOD OF TREATMENT OF WATER CONTENT OF A POOL

Henry N. Armbrust, Jamestown, R.I., assignor to The New York Air Brake Company, a corporation of New Jersey
Filed Mar. 15, 1962, Ser. No. 179,884
6 Claims. (Cl. 210—50)

This invention relates to the treatment of the water content of a pool or tank for containing captive aquatic mammals such as porpoises, aquatic birds such as penguins, and fish.

In the display of captive aquatic animals in a pool, frequently one wall of the pool will be transparent for better viewing the animals. Large display pools often have viewing windows at intervals around the sides. A problem, however, exists in keeping the water in the pool sufficiently clear so that the animals may be viewed. The problems in the clarity of the water involve excretions from the animals, food which may be put in the water and the presence and growth of bacteria, algae and such. Many of the solid materials are found to be present as such minute particles that they pass through the ordinary sand filter, thus filtering through the ordinary filter is of little or no effect. Conventional chemical treatments tending to agglomerate the particles affect the mucous membranes and are dangerous to the animals. Fecal bacteria introduced into the water by the inhabitants in relatively large numbers tend to make the water hazy. They also produce obnoxious odors and unless their growth is prevented and they are continuously removed, they will detrimentally affect the lives of the inhabitants. Bacteria can be killed by many of the conventional bactericides used in the purification of potable or industrial water; however, their use is generally detrimental to the health of the pool inhabitants and may kill them.

One of the objects of this invention is to provide a treatment of the water of a pool in which aquatic mammals are captive in such a way as to maintain the clarity of the water without detriment to the animals so that a pool of substantial size will be cleared to view the animals substantially the length of the pool.

Another object of the invention is to maintain the pool safe for the animal life in the pool and have the water of such a character that it will not generate unpleasant odors.

With these and other objects in view, the invention consists of certain novel features of construction as will be more fully described and particularly pointed out in the appended claims.

The figure in the drawing is a diagrammatic view illustrating the use of a filter and various chemicals fed into a circulating system connected to the pool so as to feed into the circulation of the content of the pool the materials required.

In proceeding with this invention, it was found that the water in a pool, although quite clear when first put into the pool, clouded very rapidly when porpoises were placed in the pool to such an extent that the animal could only be seen through a transparent wall of the pool when but a few feet distant. The porpoises were known to excrete a waste material of an ammoniacal nature which was strongly alkaline and tended to raise the pH to such an extent that it might be injurious to the animal and also the excretions were such as to be of a very finely divided colloidal nature and such that they could not be removed with the ordinary sand filter which is generally used for pools, and the material was such that it even would pass through a diatomite filter. In fact, much of the fecal debris was of such a colloidal nature as to be invisible except through an electron microscope. As in water works and industrial operations, this kind of colloidal matter can be agglomerated or coalesced by a process of flocculation and coagulation with alum or iron salts introduced into the water with an alkali to react to form aluminum hydroxide or ferric hydroxide. Alum and iron salts used as coagulants are acid salts and are conventionally added to the water and are mixed thoroughly before the alkali is added. This results in a marked lowering of the pH of the water. The normal dosages in water works and industrial plants, of from 8 p.p.m. to 64 p.p.m., is so strong that such treatment with animal life present is deemed inadvisable.

I have found that by using from .75 p.p.m. to 5 p.p.m. of preformed ferric hydroxide, that this amount of material is not harmful to the animal life in the pool and will provide sufficient coagulation so that the particles coagulated may be filtered out with a diatomite filter. This ferric hydroxide is formed by ferric chloride and calcium hydroxide, and I mix these in a proportion to provide the ferric hydroxide and then introduce this ferric hydroxide into the water to be treated. The ferric hydroxide itself will cause some cloudiness to the water as it enters, and therefore if it is to be used during the time that the animals in the pool are to be viewed, it should be introduced as the water leaves the pool and will react with the water as it moves through a conduit to the filter. However, the action of the ferric hydroxide will be more complete if it were to act in the pool itself, and therefore during the night or when viewing is not to be had, I may introduce the ferric hydroxide into the circulating system just before the entry of the conduit of the circulating system into the pool. For instance, the pool as shown in the attached drawing is designated generally 10, a filter is designated 11 and a conduit 12 connects the filter to the pool so that water may flow through this conduit 12 to the filter and be returned to the pool by pump 14 through conduit 15. I feed reacting proportions of ferric chloride shown at 16 and calcium hydroxide shown at 17 to a mixing and reaction chamber 18 and then cause the ferric hydroxide to enter the conduit 12 adjacent the junction 19 of this conduit with the pool for conditions where the action is to take place during viewing or at point 20 of the junction of the line 15 with the pool for such times as viewing is not present, in which case the action of the ferric hydroxide may take place in the pool causing coagulation which will then be removed by the filter as the liquid passes through the filter through the conduit 12. The control of flow of the ferric hydroxide is had by the opening or closing valves 23 and 24.

In order to reduce the bacteria which may be present in the pool, I inject into the circulating system a quantity of a stabilized solution of available chlorine dioxide from which chlorine dioxide is released in small concentrations on contact with organic matter. While it is known that chlorine or chlorine dioxide as such will injuriously affect the animal life in the pool, I have found that chlorine dioxide will not affect the animal life in the pool in the form and in the quantities in which I introduce it. This chlorine dioxide, while it may be put in at any place, is advantageously put in just ahead of the filter as it is on the filter bed where the solid particles collect that the majority of the bacteria will be concentrated, and therefore it is desirable to have a more concentrated part of the chlorine dioxide at the filter as furnished by adding it at point 21 just ahead of the filter. The amount of chlorine dioxide which is to be added is determined by an orthotolidine test, which is a well known color test. A sample of the pool water is put into a standard comparator tube and a standard orthotolidine solution, which is a solution of orthotolidine in hydrochloric acid, is added. The tube is then shaken to thoroughly mix the contents.

In the presence of available chlorine, which is a combination of oxygen and chlorine, a yellow color immediately develops, the intensity of which is dependent upon the available chlorine concentration. The color of the sample is compared to color standards to determine the concentration or so-called residual chlorine value. Free available chlorine as opposed to combined available chlorine, which is available chlorine combined with nitrogen, or nitrogen and hydrogen, to form chloramines, will be indicated by the comparison immediately after the addition of the orthotolidine. Upon standing for about 15 minutes a deeper color may develop due to combined available chlorine which may be present. Thus it is possible to determine the total available chlorine and to differentiate between the free available chlorine and the combined available chlorine.

As the chlorine dioxide reacts as free available chlorine, it is obvious that the immediate reading, which is known as a flash residual, will indicate the concentration of this material; whereas the flash residual subtracted from the total residual on standing, will indicate the concentration of other forms of chlorine. In the reaction of the chlorine dioxide with organic matter including bacteria, chloramines may be formed and the chlorine dioxide itself used up. Sufficient solution is fed to produce a flash residual of 0.1 to 0.5 p.p.m. I have found that this is sufficient to control the bacteria, to retard algae growth, and to prevent the generation of odors, yet will not harm the inhabitants of the pool.

The pH of the pool is controlled by feeding in muriatic acid of a commercial grade or other compatible acid at any point in the circulating system. Although I have shown this in the figure as being introduced at 22 close to the filter, it may be introduced anywhere in the circulating system. The quantity of acid which is introduced is dependent upon the pH of the pool water, and the amount added is sufficient so as to maintain the pH between 7.5 and 8.0. Thus the alkalinity caused by the excretions of the animals is neutralized to a point such that the pool water is not harmful to the inhabitants.

Each one of the above steps makes some contribution to the clarity and liveableness of the pool water and together provide a result which has been found satisfactory.

*Example*

A pool containing 180,000 gallons or about 1,440,000 pounds of water, when first filled, was found to have a pH of 7.4. The pool contained four porpoises and after a period of about 12 hours the pH was found to have risen to 8.6. In order to reduce the pH to 7.6 it was found necessary to introduce 3 gallons of muriatic acid, containing approximately 33.5% HCl. It was also found that the pool became increasingly hazy when no means of coalescing the colloidal particles was used. After four days, during which the water was continuously filtered, it was impossible to see more than 2 or 3 feet into the pool from the side windows, and the pool had to be dumped and refilled with clean water. Later, using my treatment method,[1] the pool water was maintained in a state of clarity exceeding that of average drinking water, with no drainage or refilling, for over five months.

I claim:

1. The method of treating the water content of a pool for captive aquatic mammals comprising providing a diatomite filter of a capacity to change the water content a plurality of times a day, circulating the water through the filter, feeding into said water content (1) stabilized solution of available chlorine dioxide which solution releases chlorine dioxide upon contact with organic material in a quantity to maintain a residual of from 0.1 to 0.5 p.p.m. of total chlorine as chlorine dioxide, (2) compatible acid in a quantity to maintain a pH of from 7.4 to 8.0 and (3) preformed ferric hydroxide in a quantity of from .75 to 5 p.p.m.

2. The method of claim 1 wherein the chlorine dioxide is fed in just ahead of the filter.

3. The method of claim 1 wherein a conduit leads from the pool to the filter and the chlorine dioxide is fed into said circulation along said conduit.

4. The method of claim 1 wherein a conduit leads from the pool to the filter and the ferric hydroxide is fed into the circulation in said conduit adjacent its junction with the pool.

5. The method of claim 1 wherein a conduit leads from the pool to the filter and a discharge conduit from the filter connects to the pool and said ferric hydroxide is fed into said filter discharge conduit.

6. The method of claim 1 in which the preformed ferric hydroxide is continuously produced by the reaction of an iron salt with an alkali in a separate reaction chamber and fed into the water content as needed.

References Cited in the file of this patent

UNITED STATES PATENTS

| | | |
|---|---|---|
| 1,324,118 | Hottinger et al. | Dec. 9, 1919 |
| 2,985,307 | Grasmere et al. | May 23, 1961 |

---

[1] Continuous addition, daily of:

(a) 2.98 pounds of ferric hydroxide obtained by reacting 4.5 pounds of ferric chloride with 3.1 pounds of calcium hydroxide;
(b) Sufficient acid to maintain the pH at 7.8;
(c) Sufficient available chlorine dioxide solution to maintain the flash residual at 0.1 p.p.m.